United States Patent [19]
Macklem

[11] 3,973,102
[45] Aug. 3, 1976

[54] HEATING AND TEMPERATURE CONTROL DEVICE FOR A BATH-LIQUID

[75] Inventor: F. Sutherland Macklem, New Canann, Conn.

[73] Assignee: Equipment Development Corporation, New Canaan, Conn.

[22] Filed: Jan. 12, 1976

[21] Appl. No.: 648,038

[52] U.S. Cl. ............................... 219/523; 219/330; 219/442; 219/511; 219/530; 337/105
[51] Int. Cl.² ......................................... H05B 3/06
[58] Field of Search ........... 219/316, 318, 328, 330, 219/337, 437, 442, 511, 523, 526, 530, 544; 337/82, 94, 99, 102, 105; 119/5

[56] References Cited
UNITED STATES PATENTS

| | | | |
|---|---|---|---|
| 2,828,389 | 3/1958 | Ellenberger | 337/105 |
| 3,322,918 | 5/1967 | Ulanet | 337/94 |
| 3,497,677 | 2/1970 | Blain | 219/523 |
| 3,737,621 | 6/1973 | Elkins | 219/318 |
| 3,803,386 | 4/1974 | Rodriques | 219/523 |
| 3,890,486 | 6/1975 | Fitzgerad | 219/523 |
| 3,892,200 | 7/1975 | Ramsauer | 119/5 |

*Primary Examiner*—Volodymyr Y. Mayewsky
*Attorney, Agent, or Firm*—Hopgood, Calimafde, Kalil, Blaustein & Lieberman

[57] ABSTRACT

The invention contemplates an automatic device for closely held temperature control of a body of liquid via an electric heater, as for example via a liquid-immersed heater element. The control device provides an enclosed air space with shared exposure to ambient air and to air that has been heated by the liquid. Thermostatic-switch means and an electrical heater element are contained within the enclosed air space and cooperate to establish an on-off supply of electrical energy to the immersed heater element.

13 Claims, 4 Drawing Figures

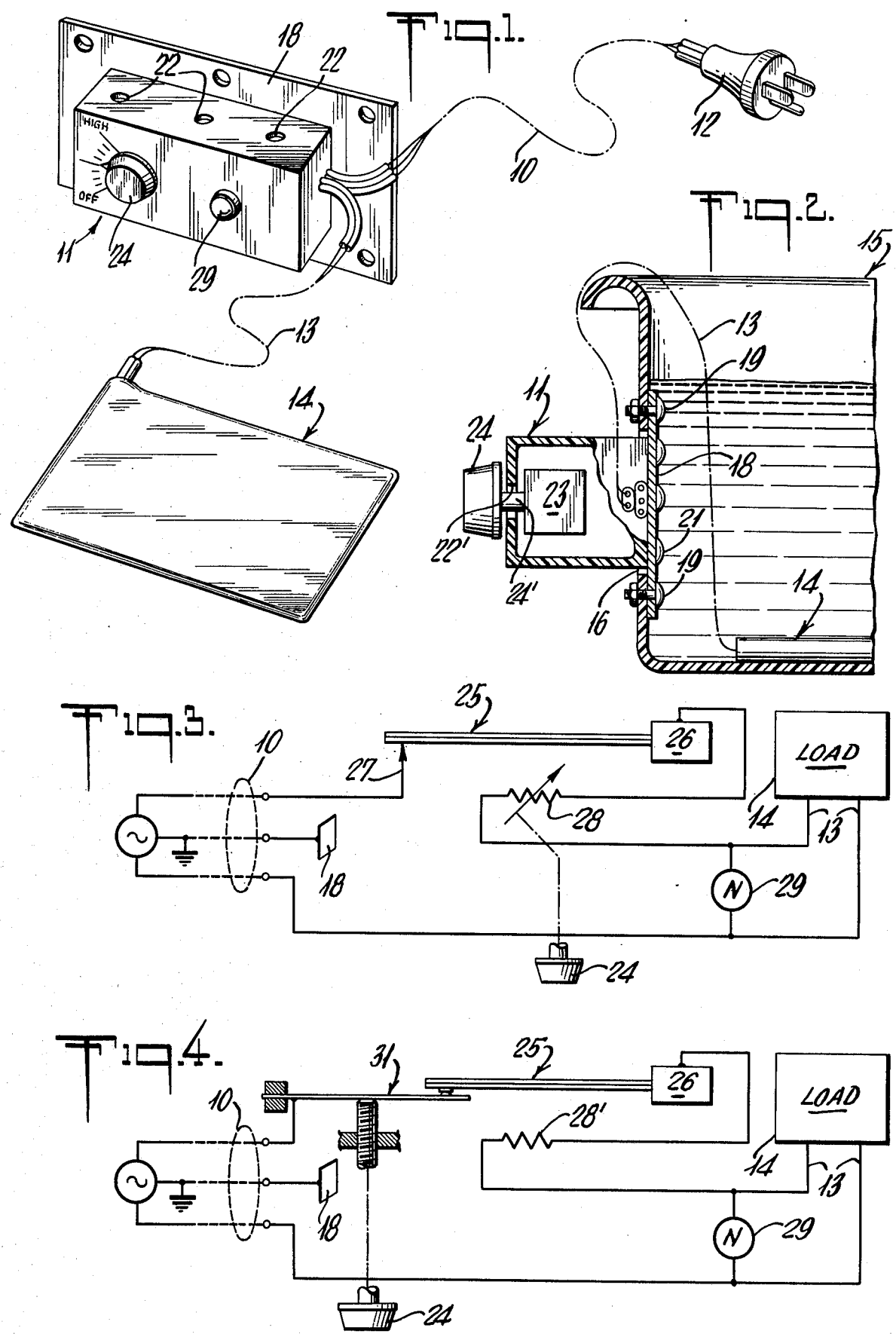

HEATING AND TEMPERATURE CONTROL DEVICE FOR A BATH-LIQUID

This invention relates to electrical devices for automatically controlled regulation of the temperature of a body of liquid, as for example a bath of water used to maintain a predetermined temperature in one or more bottles of photographic-processing liquids.

It is an object to provide an improved device of the character indicated.

Another object is to provide such a device having superior properties of maintaining within relatively close tolerance limitations the temperature of a body of liquid.

It is also an object to achieve the above objects without reliance upon temperature sensing instrumentation placed within the body of liquid to be temperature-controlled.

A further object is to achieve the above objects with a device which lends itself to relatively simple selective adjustment for a desired change in regulated temperature and which is highly accurate in its ability to hold regulation of a newly selected temperature.

A specific object is to meet the above objects with control structure combined or readily combinable with cord-set components, to the end that electrical-connection requirements are reduced to a minimum.

Another specific object is to meet the above specific object with control structure which is readily assembled to or embodied in existing liquid bath or tank facilities.

A general object is to achieve at low cost a significant improvement in reliability and accuracy of performance in temperature-control devices of the character indicated.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a view in perspective of a cord-set embodiment of the invention;

FIG. 2 is a simplified view in partial section, to show an illustrative mounting application of the control component of FIG. 1;

FIG. 3 is a simplified diagram of electrical and mechanical parts of one embodiment of the control component; and FIG. 4 is a similar diagram to show another embodiment.

Referring to FIG. 1, the invention is shown in application to a complete cord set, involving an elongate first flexible multiple-conductor insulated cable or cord 10 between a control device 11 and a remote plug 12 for conventional connection to a standard outlet receptacle, and a second elongated flexible multiple-conductor insulated cable or cord 13 between control device 11 and an electrical heater element 14 adapted for liquid immersion. Heater element 14 is shown as a sealed flat and flexible component embodying resistance wire and adapted to conform to the bottom contour of the developing pan or other vessel in which it is placed for liquid immersion.

In accordance with the invention, the control device 11 incorporates full capability to regulate the supply of electric energy to the immersion heater 14, such that the heated liquid will, within the heating capacity of heater 14, achieve and hold to close tolerance limitations the desired temperature above ambient-air temperature. For example, in a photographic-processing application, wherein a tank, tray or other vessel 15 (FIG. 2) has a 3-gallon liquid capacity, an immersion heater 14 of 150-watt capacity can be controlled by means 11 to accurately hold any selected liquid temperature in the range extending to as much as 30° Fahrenheit above ambient air; thus, for ambient air at 70° (normal room temperature), the invention will serve to retain a body of liquid at any selected temperature from 70°F. to 100°F.

As shown, the control device 11 is adapted to become a sealed insert or closure panel in an opening 16 which is cut or formed at a subsurface elevation in a side wall 17 of the vessel 15. A thermally conductive base panel or sensor plate 18, as of black anodized aluminum (shown grounded by bolt 10' to the ground element of grounded supply cord 10) is of sufficient area dimensions to peripherally continuously overlap all margins of the wall opening 16, being sealed thereto and secured as by bolts 19. Panel 18 thus readily assumes the temperature of the liquid contents of vessel 15 and, in the case of a plastic vessel 15, serves as a relatively ready source of heat dissipation from the liquid to the local external air. A cupped enclosure 20 of lesser heat-conducting capability, as of molded plastic, is secured by means 21 to the central or air-exposed region of panel 18, and one or more walls of the enclosure 20 may be apertured (as at 22) to enable a degree of ambient-air access to the inner space or cavity defined by panel 18 and enclosure 20. The air temperature within this inner space may thus always be a composite or resultant, reflecting something intermediate (a) the instantaneous temperature of the liquid and (b) ambient-air temperature, but due to the direction of heat flow (from heated liquid to ambient air) the air temperature within enclosure 20 tends more closely to track the temperature of the liquid.

To achieve the desired control, I utilize thermostatic-switch means in conjunction with a small local heater element such a 1-ohm strip of electrical-resistance heater material. Both these elements are contained within the enclosure 20 and in FIG. 2 are symbolized generally, at 23. The thermostatic switch closes to connect the local heater element to the power source and opens to disconnect the heater element upon thermostatic detection of a predetermined upper limit of temperature above ambient air, selectively pre-set by manual means 24; and, concurrently with each excitation of the local heater element, supply voltage is applied to the immersion heater 14. The opening 22' for the shaft 24' of manual means 24 may substantially clear the shaft and thus provide the sole aperture for ambient-air access to the cavity within enclosure 20, thus replacing apertures 22, as shown in FIG. 2. Since the thermostatic element of the switch is always exposed to a composite of panel-dissipation of heat from the liquid, in the context of ambient air and the periodic heat-radiation attributable to the local heater element, an equilibrium cycle is attainable in which excitation (vs. disconnect) time for the local heater element (and accompanying heat input to the liquid via heater 14) is exactly correct to maintain a given temperature of the liquid.

Referring more particularly to the embodiment of FIG. 3, the thermostatic switch is seen to comprise bimetallic means 25 cantilevered from a fixed base 26 and exposed to the instantaneous composite of air-temperature conditions noted above. When sufficiently cooled, the bimetallic means 25 establishes closure of the thermostatic switch contact 27, causing supply voltage (via cord 10) to be applied to the local heater element 28, to the load 14, and to an indicator lamp 29. The local heater element 28 is shown as a variable resistance, selectively set by means 24, as will later be explained. Contact closure initiates the heating phase of the on-off cycle of switch means 25–27, said phase being terminated upon opening contact 27, at end of the time required for means 25 to sufficiently deflect in response to the noted composite of heat supplied by means 28 in the context of bath temperature and ambient-air temperature.

In the embodiment of FIG. 4, the selectively operable means 24 rotates a jack screw 30 by which a contact member 31 is variously positioned for switch closure in relation to the bimetallic means 25, and the local heater resistance 28' is fixed rather than variable. Parts are otherwise as in FIG. 3, but again the duty cycle of heat energy at the load 14 is seen to reflect selection at 24 and the above-noted composite of air temperature conditions within the enclosure 20.

Operation of my described device will be seen to involve a continuous succession of on-off cycles of power to elements 14-28-29, when close to the set-point temperature selected at 24. The cycling action makes the control of true power-proportioning temperature control, and this is what makes it possible for the thermostatic means to hold temperature so extremely constant. Although the controlled on-off delivery of power to heater 14 may be reflected in a small but detectable fluctuation in bath-liquid temperature, the average temperature will nevertheless remain very constant, and if the bath 15 is used for heating bottles of photographic chemicals, the chemicals in the bottles will be subjected only to the average temperature in the bath, due to muffling (i.e., thermal lag) attributable to the bottle material.

Circulation is provided by convection, rising from the immersed heater 14. Warmed liquid rises to the surface continuously and spreads over the whole surface of the liquid. Thus, surface temperature is warmer than bottom temperature, and it is recommended that to measure bath temperature with a thermometer, the thermometer should be placed to the bottom of the bath and offset from heater 14. This avoids errors due to taking temperature at different depths; it also gives a reading that is very close to the temperature of liquid contents of bottled products being heated by the bath. In general, the temperature in bath-heated bottles will be slightly lower than the average bath temperature. At the low end of the controllable temperature range the difference is hardly detectable, but at the high end, i.e., when the temperature rise selected at 24 is relatively great, the difference may be as much as a full degree Fahrenheit, or more.

While it is of course possible to calibrate the selectively operable means, for temperature vs. dial settings, I do not recommend this practice if temperature must be held to tolerances as close as within ¼ of 1°F., or better. The two most compelling reasons for not using dial calibrations are (1) that it is generally impossible to set and reset a calibrated dial with requisite precision, and (2) the device will take undue time to attain the set-point temperature, since it cycles on and off upon approach to the set-point temperature.

On the other hand, due to the way in which my control device operates, it is possible to set and reset a desired temperature with extremely high precision, using a good thermometer and a watch. This can be done by approaching the desired temperature either from above or below it. Approaching from above has the advantage that it will bring heated-bottle contents up to temperature more quickly; approaching from below is somewhat quicker at the low end of the range.

EXAMPLE I

To illustrate, for an approach from above, for an assumed objective of a 100°F. set-point temperature for bath-heated bottle contents, the following steps are recommended:

1. Using hot water, bring the bath temperature to a thermometer-indicated temperature of 102°F. or higher, at desired water depth.
2. With the control means 24 in the full-OFF position, monitor the water-bath 15 bottom temperature with an accurate thermometer, waiting until it reaches STOP temperature, i.e., 100°F. or a fraction of a degree higher.
3. At attainment of the STOP temperature, advance control 24 to the full-ON or HIGH setting, say for exactly 1 minute. This will be the STOP time, or a first approximation thereof.
4. At conclusion of this STOP time, gently back-off the control knob 24, until the light 29 just goes out.

[The temperature should now be at the desired 100°F. set-point and should remain there].

5. At the end of a half hour or more, check the water-bath temperature. If it has fallen below 100°F., repeat the setting procedure, using a 2-minute STOP time and/or a slightly higher STOP temperature; but do not use a STOP temperature that is more than 0.5°F. above the desired set-point. On the other hand, if at the end of the half hour, the water-bath temperature has risen above the desired set-point temperature, the STOP time should be decreased to a half minute. Two or three such attempts should develop the optimum STOP time and STOP temperature.

EXAMPLE II

To illustrate, for an approach from below the set-point, a technique recommended for the case of a set-point close to ambient-air temperature, for example, a set-point of 75°F.:

1. Using warm water, bring the bath temperature to 73°F. or lower, and to the desired depth.
2. With the control 24 at the full ON or HIGH position, monitor the water-bath bottom temperature with an accurate thermometer, and wait until it reaches the STOP temperature, which will be 75°F. or a fraction of a degree lower.
3. At the STOP temperature, back-off the control 24 to the full-OFF position, say for exactly 1 minute. This will be the STOP time.
4. At the end of the STOP time, gently advance the control knob 24 until light 29 just comes on.

[The temperature should now be at the desired 75°F. set-point and should stay there].

5. At the end of a half hour or more, check the water-bath temperature. If it has risen above 75°F., repeat the setting procedure using a 2-minute STOP time and/or a slightly lower STOP temperature; but do not use a STOP temperature that is more than a half degree below the desired set-point. On the other hand, if at the end of the half-hour, the water-bath temperature has fallen below the desired set-point temperature, the STOP time should be decreased to ½ minute.

TEMPERATURE TRIMMING

If for either of the above examples, the indicated control procedure happens to achieve almost but not exactly the desired set-point, the observed temperature will change very slowly, amounting to perhaps a half a degree in several hours. To trim the setting upward, one should first wait until the pilot light 29 next goes out and then, immediately, advance the knob 24 just enough to relight the pilot 29. Similarly, to trim the temperature downward, one should first wait until the pilot 29 next comes on and then, immediately, back off knob 24 just enough to extinguish light 29. Such trimming adjustments are very slight, amounting to an almost imperceptible movement of the control knob 24.

Conclusion

The described device will be seen to have achieved all stated objects, making possible a new temperature control technique which tests have shown to be extremely accurate in setting and maintaining constant the temperature of photo-processing chemicals in plastic bottles in a water bath, using a plastic tray 15. In extensive tests with 3 inches of water in a 12 × 17 (inches) tray 15, and with three inches of liquid in 16-ounce plastic bottles standing in the tray, chart-recorded temperature runs have been made with a thermocouple probe in one of the bottles, using a 150-watt heater 14; these tests have revealed that my control means 11 allows no detectable temperature variation for long periods. In general, chart recordings for operation in the presence of line-voltage fluctuations from 105 to 135 volts have shown no effect on the ability of device 11 to hold a set temperature in the liquid, but a low line voltage may render the 150-watt heater 14 inadequate to serve the indicated liquid volume at a high set temperature, e.g., 100°F., necessitating use of a second and parallel-connected heater element 14 for the necessary additional wattage; stated in other words, as long as the heater 14 is of sufficient capacity to accommodate the desired temperature of the desired volume of liquid, the invention is self-compensating with respect to line voltage fluctuations, e.g., a higher line voltage means less heating time per cycle to achieve the same result, at both heaters 14 and 28.

While the invention has been described in detail for the illustrated preferred forms, it will be understood that modifications may be made without departure from the scope of the invention. For example, in using the invention to control bath temperature within a metal tank or tray (rather than a plastic tank), it is not necessary to cut an opening 16 in the metal tank, because the sensor plate 18 may be secured, as by a single screw, in direct metal-to-metal conductive contact with the outer surface of a side wall of the metal tank or tray, preferably of course at an elevation below liquid level in the tank, so that the sensor plate 18 will still perform its function of directly (i.e., metallically) conducting a sensed water-temperature input to the inner space of enclosure 20.

Still further, it will be understood that the use of the flat heater element 14 is purely illustrative of the load and that other forms of immersed heater element may better serve particular applications. For example, by employing insulated heater wire as the load 14, it is possible to "shape" or be selective in the area-distribution of heat from load 14, over the bottom of the tank. For this purpose, a highly satisfactory heater load 14 is established by a 10-ft. length of the flexible heater wire customarily used for defrosting of domestic refrigerators; the Springfield Wire Company, of Springfield, Massachusetts, makes a very satisfactory wire of this type, being resistance wire wound around a glass-fiber core, and having an extruded-rubber insulating cover.

What is claimed is:

1. A bath-liquid heating and temperature control device, comprising a thermally conductive metal panel including means adapting one side of said panel for direct thermal response to a body of liquid, and a thermostat enclosure carried by the other side of said panel such that said panel forms part of at least one wall of the inner space otherwise defined by said enclosure, said enclosure having at least one vent to ambient air, whereby the air temperature of space within said enclosure is a composite reflection of both ambient-air temperature and the temperature of liquid to which said panel is thermally exposed, an electrical-heater element within said space, a power-input connection to said enclosure, thermostatic-switch means within said space and set to effectively disconnect said power-input connection from said heater element upon achievement of a predetermined upper limit of heating of said space above ambient temperature, the setting of said thermostatic-switch means being also such as to connect said heater element to said power-input connection for a detected temperature of said space below a lower limit above ambient temperature, and power-output connection means including a liquid-immersion electrical heater for immersion in the body of bath-liquid and so connected to said thermostatic-switch means that output power is deliverable via said power-output connection means coincidentally with connection of said heater element to said power-input connection, whereby said liquid-immersion heater may be effectively on-off regulated by said thermostatic-switch means in accordance with its composite response to the temperature of ambient air and of bath liquid.

2. A bath-liquid heating and temperature control device, comprising a thermally conductive metal panel including means adapting one side of said panel for direct thermal response to a body of liquid, and a thermostat enclosure carried by the other side of said panel such that said panel forms part of at least one wall of the inner space otherwise defined by said enclosure, said enclosure having relatively low thermal conductance with respect to said panel and having at least one vent to ambient-air, whereby the air temperature of space within said enclosure is a composite reflection of both ambient-air temperature and the temperature of a liquid to which said panel is thermally exposed, an electrical heater element within said space, a power-input connection to said enclosure, thermostatic switch-contact means within said space in series with said power-input connection and with said heater element, said switch-contact means being set to open upon achievement of a predetermined upper limit of heating of said space above ambient temperature and to close for a detected temperature of said space below a lower limit above ambient temperature, and power-output connection means including a liquid-immersion electrical heater for immersion in the body of bath-liquid and in series with said power-input connection and with said switch-contact means, whereby said liquid-immersion heater may be on-off regulated by said thermostatic switch-contact means in accordance with its composite response to the temperature of ambient air and of bath liquid.

3. The device of claim 2, in which said enclosure is carried by the said panel at a region which is spaced from all border edges of the panel, thereby defining a peripherally continuous rim of said panel for direct mounting to a bath-wall opening.

4. The device of claim 2, and including an externally visible indicator-lamp means so connected to said switch-contact means as to display the closed vs. open conditions thereof.

5. The device of claim 2, in which said switch-contact means includes selectively operable means for varying the set temperature for contact-opening.

6. The device of claim 2, in which said heater element is a variable resistor with externally accessible means for selectively varying the same, whereby the contact-closure time of said switch means may be selectively adjusted.

7. The device of claim 2, in which said panel is flat.

8. The device of claim 2, in which said panel is of black anodized aluminum.

9. As an article of manufacture, a liquid-immersion electrical heater and flexible cord set for controlled supply of electrical energy thereto; said cord set including a bath-liquid temperature control device with an elongate flexible multiple-conductor insulated cord output connection to said heater; said temperature-control device comprising a thermally conductive metal panel including means adapting one side of said panel for direct thermal response to a body of liquid, and a thermostat enclosure carried by the other side of said panel such that said panel forms part of at least one wall of the inner space otherwise defined by said enclosure, said enclosure having relatively low thermal conductance with respect to said panel and having at least one vent to ambient air, whereby the air temperature of space within said enclosure is a composite reflection of both ambient-air temperature and the temperature of a liquid to which said panel is thermally exposed, an electrical heater element within said space, a power-input connection to said enclosure, thermostatic switch-contact means within said space in series with said power-input connection and with said heater element, said switch-contact means being set to open upon achievement of a predetermined upper limit of heating of said space above ambient temperature and to close for a detected temperature of said space below a lower limit above ambient temperature, said output cord connecting said liquid-immersion heater in series with said power-input connection means and with said switch-contact means.

10. The article of claim 9, in which said cord set further includes a second elongate flexible multiple-conductor insulated cord providing said power-input connection and having means at one end for remote detachable connection to an electrical source.

11. The article of claim 9, in which said second cord has three conductors one of which has a grounding connection to said panel.

12. The article of claim 9, in which said enclosure is of plastic material.

13. The article of claim 9, in which said thermostatic switch-contact means includes an externally actuable rotatable shaft for selectively varying the temperature setting thereof, said shaft passing through said vent with sufficient clearance to permit the venting of ambient air to inner space of said enclosure.

* * * * *